(12) United States Patent
Chapman

(10) Patent No.: US 9,618,220 B2
(45) Date of Patent: Apr. 11, 2017

(54) FILTRATION MATERIALS USING FIBER BLENDS THAT CONTAIN STRATEGICALLY SHAPED FIBERS AND/OR CHARGE CONTROL AGENTS

(71) Applicant: Rick L. Chapman, Ventura, CA (US)

(72) Inventor: Rick L. Chapman, Ventura, CA (US)

(73) Assignee: DelStar Technologies, Inc., Middletown, DE (US)

( * ) Notice: Subject to any disclaimer, the term of this patent is extended or adjusted under 35 U.S.C. 154(b) by 204 days.

(21) Appl. No.: 14/582,287

(22) Filed: Dec. 24, 2014

(65) Prior Publication Data

US 2015/0137415 A1 May 21, 2015

Related U.S. Application Data

(62) Division of application No. 13/280,500, filed on Oct. 25, 2011, now Pat. No. 9,074,301.

(60) Provisional application No. 61/406,301, filed on Oct. 25, 2010.

(51) Int. Cl.
| | |
|---|---|
| *B03C 3/28* | (2006.01) |
| *D01F 1/00* | (2006.01) |
| *F24F 3/16* | (2006.01) |
| *D01D 5/06* | (2006.01) |
| *D01F 6/06* | (2006.01) |
| *D01F 6/38* | (2006.01) |
| *D06M 13/00* | (2006.01) |
| *D04H 3/018* | (2012.01) |

(52) U.S. Cl.
CPC ................ *F24F 3/166* (2013.01); *B03C 3/28* (2013.01); *D01D 5/06* (2013.01); *D01F 1/00* (2013.01); *D01F 6/06* (2013.01); *D01F 6/38* (2013.01); *D04H 3/018* (2013.01); *D06M 13/00* (2013.01)

(58) Field of Classification Search
CPC combination set(s) only.
See application file for complete search history.

(56) References Cited

U.S. PATENT DOCUMENTS

| | | | |
|---|---|---|---|
| 4,206,064 | A | 6/1980 | Kiuchi et al. |
| 4,394,430 | A | 7/1983 | Jadwin et al. |
| 4,404,270 | A | 9/1983 | Higashida et al. |
| 4,496,643 | A | 1/1985 | Wilson et al. |

(Continued)

FOREIGN PATENT DOCUMENTS

| | | |
|---|---|---|
| EP | 0347695 | 12/1989 |
| JP | 07-097515 | 11/1995 |

(Continued)

*Primary Examiner* — Duane Smith
*Assistant Examiner* — Sonji Turner

(57) ABSTRACT

A filtration material comprising a blend of polypropylene and acrylic fibers of round, flat, dog bone, oval or kidney bean shape in any size from 0.08 to 3.3 Dtex. A preferred blend contains about 50 weight percent polypropylene fibers and about 50 weight percent acrylic fibers. The fibers can be blended ranging from 90:10 to 10:90 polypropylene to acrylic. The shape contains 25 weight percent round, flat, oval, dog bone and kidney bean shapes. The fiber blend contains 25 weight percent of at least one size between 0.08 and 3.3 Dtex. Electret fibers incorporated within these blends have 0.02 to 33 weight percent of a charge control agent. These fibers can be used in producing electret material by corona or triboelectric charging methods.

6 Claims, 5 Drawing Sheets

(56) References Cited

U.S. PATENT DOCUMENTS

| | | |
|---|---|---|
| 4,707,429 A | 11/1987 | Trout |
| 4,760,009 A | 7/1988 | Larson |
| 4,798,850 A | 1/1989 | Brown |
| 4,833,060 A | 5/1989 | Nair et al. |
| 4,840,864 A | 6/1989 | Bugner et al. |
| 4,874,399 A | 10/1989 | Reed et al. |
| 4,912,006 A | 3/1990 | Breitschaft et al. |
| 4,977,056 A | 12/1990 | El Sayed |
| 5,021,473 A | 6/1991 | Macholdt |
| 5,026,621 A | 6/1991 | Tsubuko et al. |
| 5,028,508 A | 7/1991 | Lane et al. |
| 5,030,535 A | 7/1991 | Drappel et al. |
| 5,034,299 A | 7/1991 | Houle et al. |
| 5,035,972 A | 7/1991 | El Sayed et al. |
| 5,045,425 A | 9/1991 | Swidler |
| 5,051,330 A | 9/1991 | Alexandrovich et al. |
| 5,061,585 A | 10/1991 | Macholdt et al. |
| 5,069,994 A | 12/1991 | Gitzel et al. |
| 5,069,995 A | 12/1991 | Swidler |
| 5,147,748 A | 9/1992 | Gitzel et al. |
| 5,192,637 A | 3/1993 | Saito et al. |
| 5,266,435 A | 11/1993 | Almog |
| 5,306,591 A | 4/1994 | Larson et al. |
| 5,308,731 A | 5/1994 | Larson et al. |
| 5,318,883 A | 6/1994 | Yamanaka et al. |
| 5,324,466 A * | 6/1994 | Orino ............... D01D 5/253 264/172.14 |
| 5,346,796 A | 9/1994 | Almog |
| 5,364,729 A | 11/1994 | Kmiecik-Lawrynowicz et al. |
| 5,368,734 A | 11/1994 | Wnenchak |
| 5,393,635 A | 2/1995 | Russell et al. |
| 5,401,446 A | 3/1995 | Tsai et al. |
| 5,407,774 A | 4/1995 | Matsushima et al. |
| 5,407,775 A | 4/1995 | Larson et al. |
| 5,409,796 A | 4/1995 | Fuller et al. |
| 5,411,576 A | 5/1995 | Jones et al. |
| 5,411,834 A | 5/1995 | Fuller et al. |
| 5,445,911 A | 8/1995 | Russell et al. |
| 5,470,485 A | 11/1995 | Morweiser et al. |
| 5,476,743 A | 12/1995 | Spiewak et al. |
| 5,482,741 A | 1/1996 | Law et al. |
| 5,484,679 A | 1/1996 | Spiewak et al. |
| 5,501,934 A | 3/1996 | Sukata et al. |
| 5,502,118 A | 3/1996 | Macholdt et al. |
| 5,518,852 A | 5/1996 | Sukata et al. |
| 5,525,448 A | 6/1996 | Larson et al. |
| 5,525,450 A | 6/1996 | Spiewak et al. |
| 5,549,007 A | 8/1996 | Raymond |
| 5,554,722 A | 9/1996 | Eichenauer et al. |
| 5,558,809 A | 9/1996 | Groh et al. |
| 5,563,016 A | 10/1996 | Baur et al. |
| 5,573,882 A | 11/1996 | Larson et al. |
| 5,585,216 A | 12/1996 | Baur et al. |
| 5,612,161 A | 3/1997 | Watanabe et al. |
| 5,645,627 A | 7/1997 | Lifshutz et al. |
| 5,681,680 A | 10/1997 | Wilson et al. |
| 5,693,445 A | 12/1997 | Yamaga et al. |
| 5,714,296 A | 2/1998 | Faust et al. |
| 5,726,107 A | 3/1998 | Dahringer et al. |
| 5,750,306 A | 5/1998 | Faust et al. |
| 5,783,346 A | 7/1998 | Jadwin et al. |
| 5,792,242 A | 8/1998 | Haskett |
| 5,800,602 A | 9/1998 | Baur et al. |
| 5,855,784 A * | 1/1999 | Pike ............... B01D 39/163 210/503 |
| 5,871,845 A | 2/1999 | Dahringer et al. |
| 5,935,303 A | 8/1999 | Kimura |
| 5,935,754 A | 8/1999 | Almog |
| 5,952,145 A | 9/1999 | Yamanaka et al. |
| 6,102,457 A | 8/2000 | Smith |
| 6,162,535 A | 12/2000 | Turkevich et al. |
| 6,211,100 B1 | 4/2001 | Legare |
| 6,444,312 B1 | 9/2002 | Dugan |
| 6,514,324 B1 | 2/2003 | Chapman |
| 6,602,457 B1 | 8/2003 | Lee et al. |
| 6,623,548 B1 * | 9/2003 | Gordon ............... B01D 39/163 264/211.17 |
| 6,723,669 B1 * | 4/2004 | Clark ............... D04H 3/16 442/329 |
| 6,780,226 B1 | 8/2004 | Lifshutz et al. |
| 6,802,315 B2 | 10/2004 | Gahan et al. |
| 6,808,551 B2 | 10/2004 | Jones et al. |
| 6,858,551 B1 | 2/2005 | Turkevich et al. |
| 6,893,990 B2 | 5/2005 | Myers et al. |
| 6,926,961 B2 | 8/2005 | Roth |
| 7,434,698 B2 | 10/2008 | Wilkins et al. |
| 7,498,699 B2 | 3/2009 | Chiang et al. |
| 7,666,931 B2 | 2/2010 | Chin et al. |
| 2001/0039879 A1 | 11/2001 | Chapman |
| 2003/0039815 A1 | 2/2003 | Roth |
| 2004/0041307 A1 * | 3/2004 | Topolkaraev ............... D01F 8/06 264/555 |
| 2005/0268817 A1 * | 12/2005 | Iwata ............... B01D 39/1623 106/146.3 |
| 2008/0249269 A1 | 10/2008 | Chin et al. |
| 2009/0130939 A1 | 5/2009 | Kimura et al. |
| 2010/0083838 A1 * | 4/2010 | Togashi ............... B01D 39/1623 96/10 |
| 2010/0159770 A1 * | 6/2010 | Walser ............... D04H 1/48 442/335 |
| 2010/0310845 A1 * | 12/2010 | Bond ............... A61F 13/5376 428/219 |
| 2013/0101805 A1 * | 4/2013 | Altshuler ............... B32B 5/022 428/172 |

FOREIGN PATENT DOCUMENTS

| | | |
|---|---|---|
| WO | 9603483 | 2/1996 |
| WO | 9636483 | 11/1996 |
| WO | 0004216 | 1/2000 |

\* cited by examiner

FILTRATION MATERIALS USING FIBER BLENDS THAT CONTAIN STRATEGICALLY SHAPED FIBERS AND/OR CHARGE CONTROL AGENTS

CROSS-REFERENCES TO RELATED APPLICATIONS

This application is a divisional of U.S. application Ser. No. 13/280,500 filed Oct. 25, 2011, which claims the benefit of U.S. Provisional Application No. 61/406,301 filed Oct. 25, 2010. These prior applications are hereby incorporated by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

The invention relates to electrostatic filtration media for gas filtration, and more particularly to various combinations of synthetic fiber media of different cross-sectional shapes with and without charge control agents, and methods of making fibers.

It is known in the filtration art that various kinds of fibers can be formed into a web or other nonwoven structure having tortuous paths between the fibers through which a gas stream, such as air, is passed to remove particulate matter from the gas stream. The particulate matter in the gas flowing through the paths in the web is retained on the upstream side of the web, or within the tortuous paths of the web due to the size of the particles relative to the paths' diameters.

Synthetic fibers come in various cross-sectional shapes including, but not limited to, round, flat, trilobal, kidney bean, dog-bone, bowtie, ribbon, 4DG (multiple grooves along a fiber's length), hollow, sheath core, side by side, pie wedge, eccentric sheath core, islands and three island. It is known to charge various blends of fibers electrostatically to further retain particulate matter through electrostatic attraction between the fibers and the particles. Such blends and other filtration improvements are shown in U.S. Pat. No. 6,328,788 to Auger, U.S. Pat. No. 4,798,850 to Brown, U.S. Pat. No. 5,470,485 to Morweiser, et al., and U.S. Pat. No. 5,792,242 to Haskett, all of which are incorporated herein by reference.

Electrostatic ("electret") filter media have increased efficiency without necessarily increasing the amount of force it takes to push the air though the filtration media. The "pressure drop" of media is the decrease in pressure from the upstream side of the media to the downstream side. The more difficult it is to force air through the media, the greater the pressure drop, and the greater use of energy to force air through the media. Therefore, it is generally advantageous to decrease pressure drop.

Electrostatically charged media is used in many different applications and in many different filters. The electrostatic charge is applied either by oxidatively treating the fibers, such as by passing the fibers through a corona, or by triboelectric charging, which is a type of contact electrification in which certain materials become electrically charged after they come into contact with a dissimilar material (such as through rubbing) and are then separated. The polarity and strength of the produced charges differ according to the materials, surface roughness, temperature, strain, and other properties. Such electrostatic charges tend to dissipate over time, and this leads to reduced efficiency in removing particles from the air stream. In particular, the efficiency of removing small particles (below 10 microns) is reduced as charges dissipate.

Currently, passive electrostatic filter media works mainly on the principle of friction from air passing over fibers and inherent static electricity in the polymer itself. Static electrification is not caused merely by air flow impacting a solid surface. In many cases a polypropylene honey-combed netting, typically with woven monofilament approximately 0.01 inches in diameter, is used in different layers or in conjunction with a urethane foam or a high loft polyester which also has inherent static charges. In the more efficiently static charged fiber filters, each fiber has both positive and negative charges. Such fibers are 1 to 30 denier in size, or approximately 0.00049 to 0.00268 inches in diameter. Generally these types of filters are more expensive than a disposable type, lasting about three months in a residential heating, ventilation and air conditioning (HVAC) unit. The efficiencies of such electret filters are known to be very good, with approximately 34% to 40% dust spot efficiency.

Charge control agents have been used to control static charges in imaging applications, such as photostatic and Xerographic (electrophotographic) processes. Positive and negative charge-control agents, charge directors, charge additives, charge adjuvants, zwitterionic materials, polar additives, dielectric substance and electroconductivity-providing agents, (ECPA's), all are referred to as charge control agents (CCA's) and are known for use in the following applications with some CCA's on some materials: powder toner, powder coating or powder electrophotographic toner, liquid toner, liquid developer, chargeable toner, electrophotographic recording, powder paint, developing toner, electrostatic copying, electret fiber material, electrophoretic image display, impulse ink jet printing, sprayable powder coating and electrostatic image developer.

The prior art filtration materials provide sufficient filtration for many environments. However, where the electrostatic charge must be retained for long periods or where the penetration through the filtration material must be below a particular percentage, the prior art does not suffice, or is prohibitively expensive to manufacture. Therefore, the need exists for a filtration material that provides the needed performance at a feasible cost to manufacture.

BRIEF SUMMARY OF THE INVENTION

Improvements in the efficiency of gas filtration media are achieved by forming filtration media fibers in cross-sectional shapes that are unique and advantageous. Additionally, unique and advantageous combinations of fibers with particular cross-sectional shapes and charge control agents are disclosed. Furthermore, disclosed herein are new methods of making fibers and fibers with charge control agents. Still further, charge control agents not previously known for use in filtration media are disclosed.

This invention improves the overall efficiency of the filtration media by enhanced charging modifications and by combining different sizes and shapes of fibers. It is part of the invention to optimize the size and shape of fibers to optimize performance, as measured by efficiency. The invention provides several different advancements of media manufacturing and chargeability of these media, increases in efficiencies based on electrostatic technology, and several different methods of enhancing the media charge and efficiency. The novel modified materials produced by doping polymers and the introduction of these polymers to an electrostatic field result in increased air filtration efficiencies.

Applicant herein incorporates the following United States patents by reference: U.S. Pat. Nos. 5,563,016; 5,069,994; 5,021,473; 5,147,748; 5,502,118; 5,501,934; 5,693,445; 5,783,346; 5,482,741; 5,518,852; 5,800,602; 5,585,216; 4,404,270; 4,206,064; 5,318,883; 5,612,161; 5,681,680; 5,061,585; 4,840,864; 5,192,637; 4,833,060; 5,394,430; 5,935,754; 5,952,145; 5,750,306; 5,714,296; 5,525,450; 5,525,448; 4,707,429; 5,045,425; 5,069,995; 4,760,009; 5,034,299; 5,028,508; 5,573,882; 5,030,535; 5,026,621; 5,364,729; 5,407,775; 5,549,007; 5,484,679; 5,409,796; 5,411,834; 5,308,731; 5,476,743; 5,445,911; 5,035,972; 5,306,591; 5,407,774; 5,346,796; 5,393,635; 4,496,643; 4,977,056; 5,051,330; 5,266,435; 5,411,576; 5,645,627; 5,558,809; 5,935,303; 6,102,457; 6,162,535; 6,444,312; 6,780,226; 6,802,315; 6,808,551; 6,858,551; 6,893,990; 6,926,961; 7,498,699; 7,666,931 and Applicant also incorporates herein by reference European Application Publication Number EP-A-0 347 695.

Figure 1:
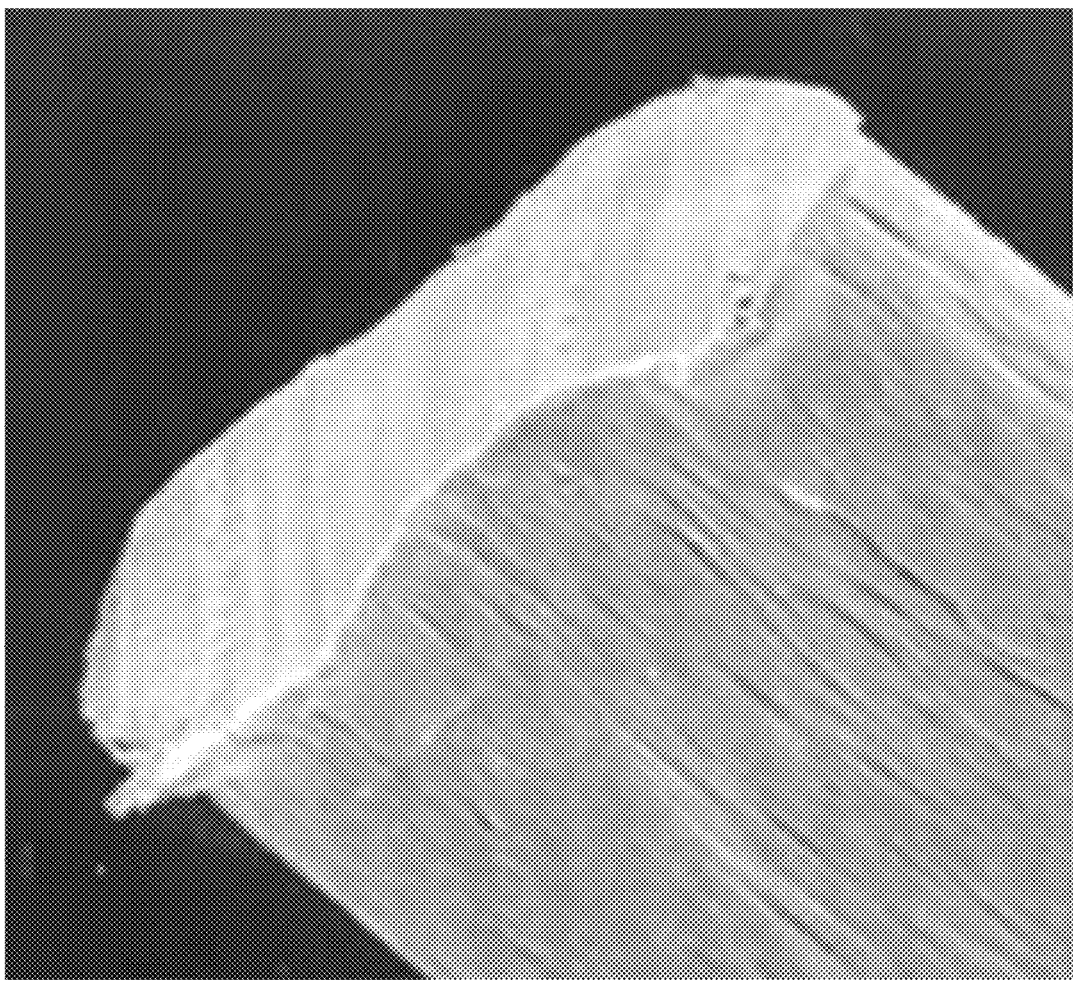
FIG. 1 is a magnified photograph of an end of a dry spun, halogen free acrylic fiber having a dog-bone-shaped cross section. A "dog-bone" cross section is defined herein as an elongated shape having opposite ends that are wider than a central region between the two ends, and the central region has a necked-down shape with both sides curving inwardly.
Figure 2:
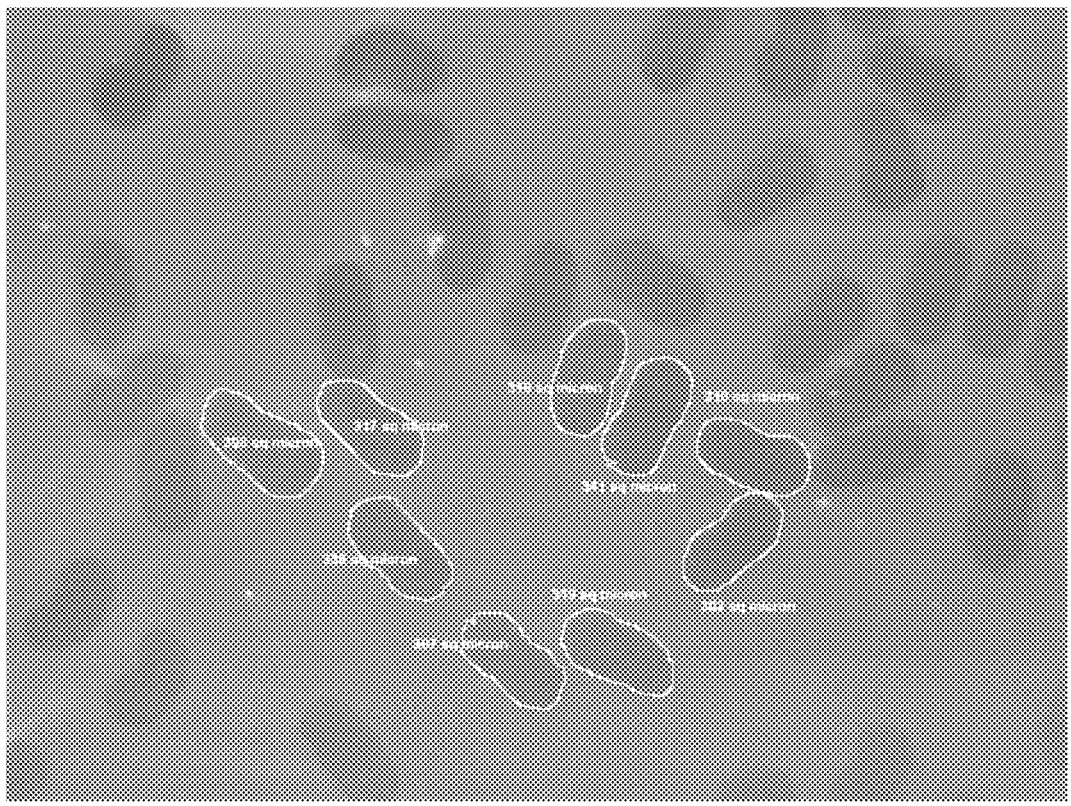
FIG. 2 is a magnified photograph of a plurality of fibers having a kidney-bean-shaped cross section. A "kidney-bean" cross section is defined herein as an elongated shape having opposite ends that are wider or about as wide as a central region between the two ends, and the central region has a necked-down shape with only one side curving inwardly substantially.
Figure 3:
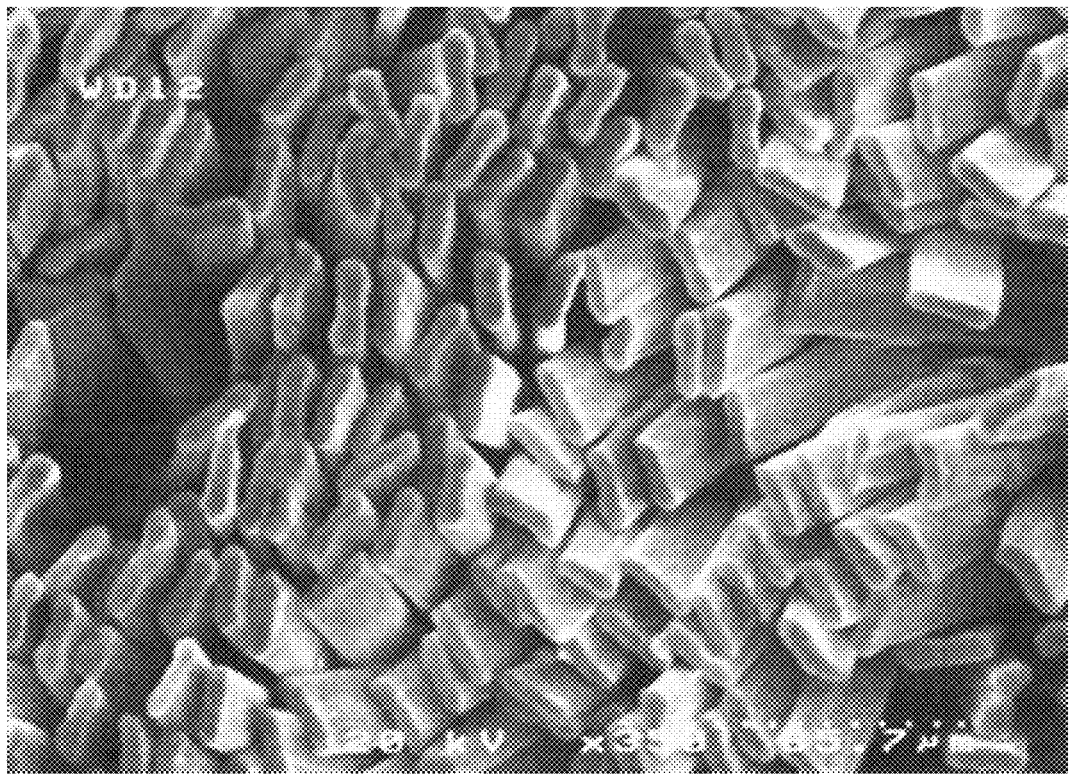
FIG. 3 is a magnified photograph of a plurality of ends of wet spun acrylic fibers having dog-bone-shaped cross sections.
Figure 4:
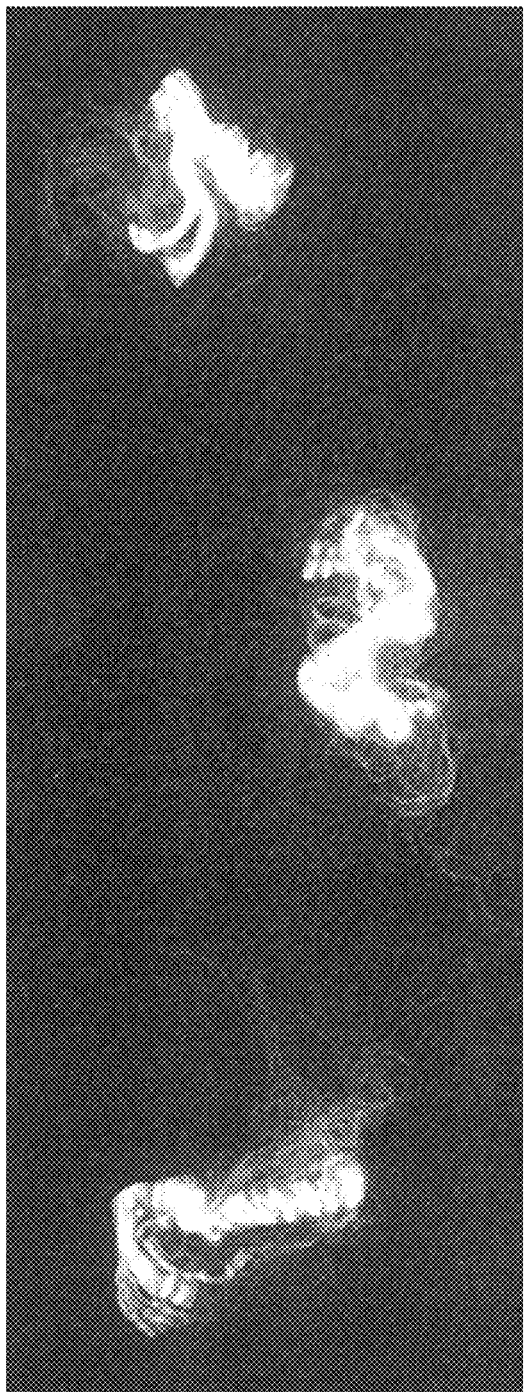
FIG. 4 is a photograph showing a plurality of clusters of fibers having a three dimensional crimp.
Figure 5:
FIG. 5 is a photograph showing a plurality of clusters of fibers having a two dimensional crimp.
Figure 6:
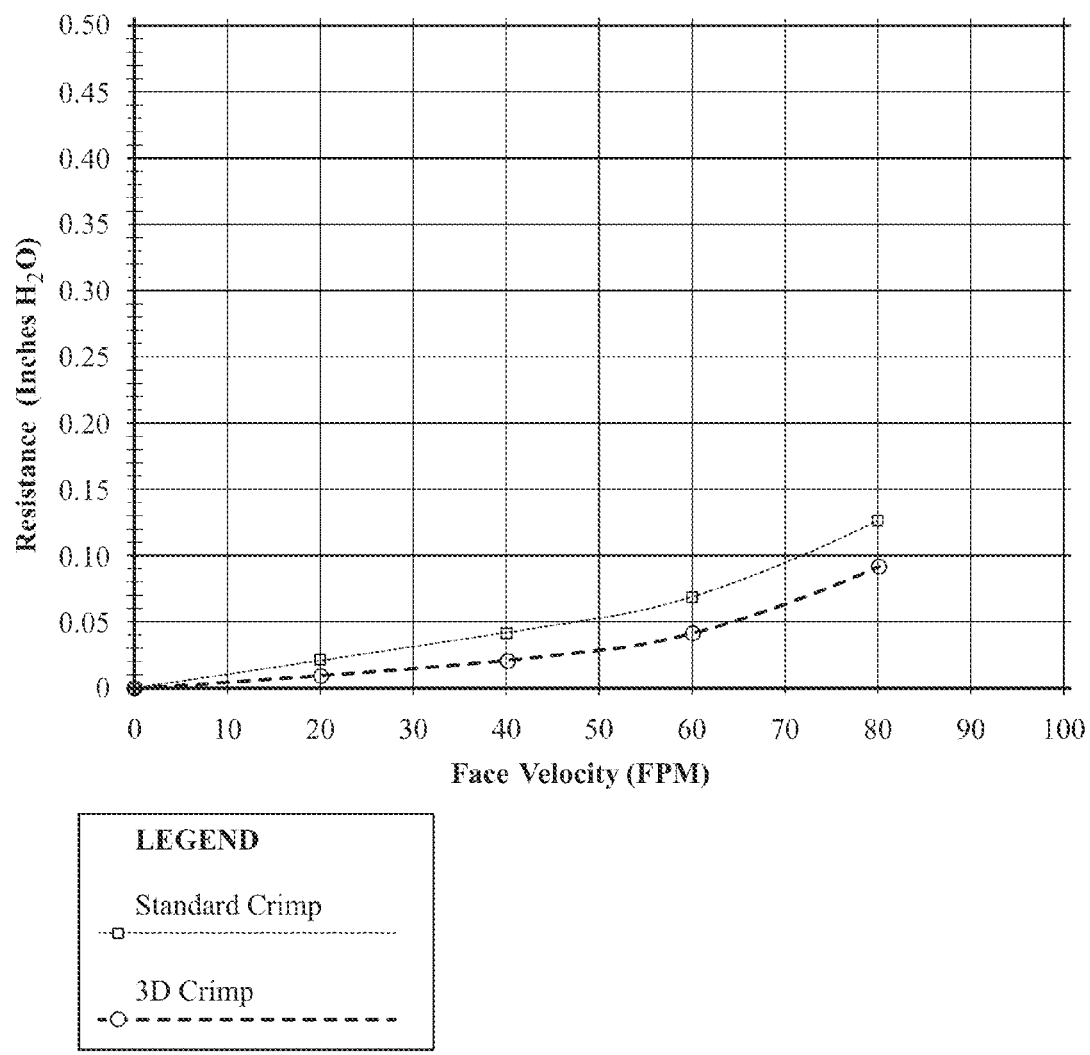
FIG. 6 is a graph illustrating the rate at which resistance to the flow of gas through two filtration media changes with increases in the velocity of gas at the face of the media.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

U.S. Provisional Patent Application Ser. No. 61/406,301 is incorporated herein by reference.

Permanent charges on fibers are provided in air filter media by compounding or doping charge control agents (CCA's) into the fiber or coating surfaces of fibers or materials utilized in the media with CCA's. CCA's are added to the fibers according to the invention in a conventional manner, except as described otherwise below. For example, the addition of CCA's to polypropylene fibers is accomplished by adding the CCA's in particulate form (powders and/or granules) to a melt just before extruding the melt and mixing thoroughly. Therefore, the CCA particles that are suspended and well-distributed in the melt are, to some degree, found at the surface of the fibers after extrusion.

The invention provides a novel method to enhance the chargeability of fibers. The object of this invention is to induce a charge field not only on the surface of the fiber, but to provide an electrostatic charge below the surface of the fiber. The invention accomplishes this objective in one embodiment by adding about 0.1 to 50 percent (by weight of materials) CCA's to polymer fibers. For example, when melting a CCA that has a melt temperature above the polymer's melting temperature, a micron-sized powder is introduced and in most cases 10-20% of the powder comes to the surface, which leaves 80 to 90 percent of the powder below the surface. This method of enhancing the charges can be utilized in most of the filtration media used today.

The CCA's operate by triboelectric or corona charging of particles, and the effects of the CCA's are superior when CCA's are on the outside of the fibers. The preferred concentration of CCA particles as a percentage of the weight of the completed fibers is between about 0.02% and about 50%, a more preferred concentration is between about 0.1% and about 40% and a most preferred concentration is between about 0.3% and about 10%.

Some of the polymer fibers used in filtration media that are suitable for charging include polypropylene, polyesters, polyethylene and cross-linked polyethylene, polycarbonates, polyacrylates, polyacrylonitriles, polyfumaronitrile, polystyrenes, styrene maleic anhydride, polymethylpentene, cyclo-olefinic copolymer or fluorinated polymers, polytetrafluoroethylene, perfluorinated ethylene and hexfluoropropylene or a copolymer with PVDF like P(VDF-TrFE) or terpolymers like P(VDF-TrFE-CFE). Propylene, polyimides, polyether ketones, cellulose ester, nylon and polyamides. Polymethacrylic, poly(methylmethacrylate), polyoxymethylene, polysulfonates, acrylic, styrenated acrylics, pre-oxidized acrylic, fluorinated acrylic, vinyl acetate, vinyl acrylic, ethylene vinyl acetate, styrene-butadiene, ethylene/vinyl chloride, vinyl acetate copolymer, latex, polyester copolymer, carboxylated styrene acrylic or vinyl acetate, epoxy, acrylic multipolymer, phenolic, polyurethane.

One or more different fibers blended in a filtration media can contain a charge control agent. This can be one fiber, two fibers, three fibers, four fibers, five fibers or six fibers in the media that are of different composition, some or all of which contain a CCA. These CCA's include but are not limited to metal salt of aluminum or magnesium, lead zirconate titanate, potassium niobate, lithium niobate, lithium tantalate, sodium tungstate, unsaturated carboxylic acid or derivative thereof, unsaturated epoxy monomer or silane monomer, maleic anhydride, monoazo metal compound, alkyl acrylate monomers, alkyl methacrylate monomers, polytetrafluoroethylene, alkylene, arylene, arylenedialkylene, alkylenediarylene, oxydialkylene or oxydiarylene, polyacrylic and polymethacrylic acid compound, organic titanate, quaternary phosphonium trihalozincate salts, organic silicone complex compound, dicarboxylic acid compound, cyclic polyether or non-cyclic polyether and cyclodextrin, complex salt compound of the amine derivative, ditertbutylsalicylic acid, potassium tetraphenylborate, potassium bis borate, sulfonamides and metal salts, cycloalkyl, alumina particles treated with silane coupling from group consisting of dimethyl silicone compound, azo dye, phthalic ester, quaternary ammonium salt, carbazole, diammonium and triammonium, hydrophobic silica and iron oxide, phenyl, substituted phenyl, naphthyl, substituted naphthyl, thienyl, alkenyl and alkylammonium complex salt compound, sodium dioctylsulfosuccinate and sodium benzoate, zinc complex compound, mica, monoalkyl and dialkyl tin oxides and urethane compound, metal complex of salicylic acid compound, oxazolidinones, piperazines or perfluorinated alkane, lecigran MT, nigrosine, fumed silca, carbon black, para-trifluoromethyl benzoic acid and ortho-fluoro benzoic acid, poly (styrene-co-vinylpyridinium toluene sulfonate), methyl or butyltriphenyl complex aromatic amines, triphenylamine dyes and azine dyes, alkyldimethylbenzylammonium salts.

A charge director is selected from the group consisting of lecithin, basic BARIUM PETRONATE and CALCIUM PETRONATE (trademarked products sold by Witco Chemical Corporation), sulfonate compounds, isopropylamine salt of dodecylbenzenesulfonic acid or diethylammonium chloride and isopropylamine dodecylbenzenesulfonate, quaternized ammonium AB diblock copolymer, polyacrylic acid, silicone carbide, PTFE particles, aluminum oxide, cross linked polymethacrylcate resin, silica acrylate complex, poly acrylic acid and amorphous silica. Yttrium (III) 2-ethylhexanoate, a Yttrium (III) acetylacetonate hydrate, Yttrium (III) tris(2,2,6,6-tetramethy-3,5-heptanedionate) or a Scandium(III) tris(2,2,6,6-tetramethyl-3,5-heptanedionate) hydrate, Scandium, Yttrium, Lutetium, and Lawrencium, metal compounds of aromatic carboxylic acids such as salicylic acid, alkylsalicylic acid, dialkylsalicylic acid, naphthoic acid, and dicarboxylic acids, the metal salts and metal complexes of azo dyes and azo pigments, polymer compounds that have a sulfonic acid group or carboxylic acid group in side chain position, boron compounds, urea compounds, silicon compounds and calixarene.

The positive-type charge control agents can be exemplified by quaternary ammonium salts, polymer compounds having a quaternary ammonium salt in side chain position, guanidine compounds, nigrosin compounds, and imidazole compounds, metal complexes of organic compounds having a carboxyl group or a nitrogen-containing group, metallized dyes, nigrosine and charge control resins, quinone compounds (e.g., p-benzoquinone, chloranil, bromanil, and anthraquinone), tetracyanoquinodimethane compounds, fluorenone compounds (e.g., 2,4,7-trinitroflurenone), xanthone compounds, benzophenone compounds, cyanovinyl compounds, and ethylenic compounds, electron hole transport compounds such as triarylamine compounds, benzidine compounds, arylalkane compounds, aryl-substituted ethylene compounds, stilbene compounds, anthracene compounds, and hydrazone compounds, a carboxyl group or a salt thereof, a phenyl group or a salt thereof, a thiophenyl group or a salt thereof and a sulfonic group or a salt thereof, inorganic particles include silicon dioxide (silica), aluminum oxide (alumina), titanium oxide, zinc oxide, tin oxide, barium titanate and strontium titanate yttrium and stearic acid, stearic acid and aluminum, poly(N-vinylcarbazole) and polysilane, aromatic hydroxycarboxylic acid and a calcium compound, fatty acid metal salt of aluminum or magnesium, fluorenone compounds, quinone compounds, alkylsalicylic acid derivative, a compound being a zincified alkylsalicylic acid derivative which is an alkylphenol derivative having a carboxyl group.

Examples of waxes include, but are not limited to, those listed herein, and include polyolefins such as polyethylenes, and the like, such as those commercially available from Allied Chemical and Baker Petrolite Corporation, and the Daniels Products Company, Epolene N-15™ commercially available from Eastman Chemical Products, Inc.

Examples of functionalized waxes include amines, amides, for example Aqua Superslip 6550, Superslip 6530 available from Micro Powder Inc., fluorinated waxes, for example Polyfluo 190, Polyfluo 200, Polyfluo 523XF, Aqua Polyfluo 411, Aqua Polysilk 19, Polysilk 14 available from Micro Powder Inc., mixed fluorinated, amide waxes, for example Microspersion 19 also available from Micro Powder Inc., imides, esters, quaternary amines, carboxylic acids or acrylic polymer emulsion, for example Joncryl 74, 89, 130, 537, and 538, all available from SC Johnson Wax, chlorinated polyethylenes available from Allied Chemical, Petrolite Corporation and SC Johnson Wax. Such waxes can optionally be fractionated or distilled to provide specific cuts that meet viscosity and/or temperature criteria wherein the upper limit of viscosity is 10,000 cps and the upper limit of temperature is 100° C.

The natural ester waxes are exemplified by candelilla wax, as ozokerite, ceresin, rice wax, Japanese wax, jojoba oil, beeswax, lanolin, castor wax, montan wax, and derivatives of the preceding. Modified waxes in addition to the preceding are exemplified by polyalkanoic acid amides (ethylenediamine dibehenylamide), polyalkylamides (tristearylamide of tri-mellitic acid), and dialkyl ketones, distearyl keto, aliphatic hydrocarbon waxes such as low molecular weight polyethylenes, low molecular weight polypropylenes, low molecular weight olefin copolymers, microcrystalline waxes, paraffin waxes, and Fischer-Tropsch waxes, oxides of aliphatic hydrocarbon waxes, such as oxidized polyethylene wax, waxes having an aliphatic acid ester as the main component, such as aliphatic hydrocarbon-type ester waxes, waxes obtained by the partial or complete deacidification of an aliphatic acid ester, such as deacidified carnauba wax, partial esters between aliphatic acids and polyhydric alcohols, such as monoglyceryl behenate, and hydroxyl-functional methyl ester compounds obtained by the hydrogenation of plant oils and fats.

The synthetic ester waxes are exemplified by monoester waxes synthesized from straight-long-chain saturated aliphatic acids and straight-long-chain saturated alcohols. The straight-long-chain saturated aliphatic acid used is preferably represented by the general formula $C_nH_{2n+1}COOH$ where n is about 5 to 28. The straight-long-chain saturated alcohol used is preferably represented by the general formula $C_nH_{2n+1}OH$ where n is about 5 to 28. The straight-long-chain saturated aliphatic acid is specifically exemplified by caprylic acid, undecylic acid, lauric acid, tridecylic acid, myristic acid, palmitic acid, pentadecylic acid, heptadecanoic acid, tetradecanoic acid, stearic acid, nonadecanoic acid, arachic acid, behenic acid, lignoceric acid, cerotic acid, heptacosanoic acid, montanic acid, and melissic acid. Ester waxes having two or more ester bonds in each molecule are exemplified by trimethylolpropane tribehenate, pentaerythritol tetrabehenate, pentaerythritol diacetate dibehenate, glycerol tribehenate, 1,18-octadecanediol bisstearate, and polyalkanol esters (tristearyl trimellitate, distearyl maleate). Modified waxes in addition to the preceding are exemplified by polyalkanoic acid amides (ethylenediamine dibehenylamide), polyalkylamides (tristearylamide of tri-mellitic acid), and dialkyl ketones, distearyl keto, metal complex salts of monoazo dyes, metal compounds of nitrohumic acid and salts thereof, salicylic acid, alkylsalicylic acids, dialkylsalicylic acids, naphthoic acid, dicarboxylic acids and so forth, boron compounds, urea compounds, silicon compounds, calixarene, sulfonated copper phthalocyanine pigments, chlorinated paraffin, low and high molecular weight fluorinated waxes.

There is also an advantage to a special crimp and crimping process in dry and wet spun acrylic fibers. Within the manufacturing process of standard wet and dry spun acrylic fibers, the fibers are crimped (bent permanently) with a so-called "tongue crimper". The crimp forms bends in the fibers that allow the fibers to lie substantially within a plane. This is referred to herein as "two dimensional" crimping, because fibers so crimped, if placed on an x-y-z axis, will extend substantially in the x and y dimensions, but not substantially in the z direction. For example, a two dimensionally crimped wet spun acrylic fiber extends many millimeters in the x direction and many millimeters in the y direction. However, a two-dimensionally crimped fiber will only extend about one millimeter or less in the z direction.

In a unique crimping process of the invention, a new kind of crimping takes place which has a substantial improvement on filtration performance. An injection tube with steam and high negative pressure pulls the fiber material at a high speed. At the end of this injection tube the material gets the chance to relax suddenly by impact and the reduced pressure. This has the effect that the material compresses itself and forms a three-dimensionally crimped fiber. A three dimensionally crimped fiber is a fiber that, if placed on an x-y-z axis, extends similar orders of magnitude in all three directions. Thus, such a fiber might extend 8 millimeters in the x direction, 15 millimeters in the y direction and 4 millimeters in the z direction. Such a dry spun acrylic fiber product is currently made having three dimensional crimping, and is sold under the product name DRALON X101. However, to Applicant's knowledge such fibers are not conventionally used in filtration applications, but only carpet and textile applications.

The three-dimensionally crimped fibers used herein in a filtration media not only takes less needling to form the media, but also advantageously form "open" media, thereby allowing more air flow through the media with less resistance, thereby supplying high efficiency filtration with less resistance to the air flow. In summary, a filtration media made with such fibers achieves high efficiency with low pressure drop.

Another method involving wet spun acrylic fibers crimped two dimensionally includes the same tongue-crimping process of the conventional wet spun acrylic fiber process, but with a difference. Instead of adding conventional surfactants and/or lubricants to the water of the wet spinning apparatus, the method includes the addition of a special organic wax to the water at a desired percentage of about 0.5% to about 5.0% to permit the crimping action but not enough to render the fiber unusable due to too much finish on the fiber to charge. The percentage of the organic wax on the fiber surface is about 0.5% to about 2% by weight of the finished fibers. The organic wax left on the fibers serves as a CCA and provides superior charge stability.

Testing below compares various fiber blends and their performance differences. All the testing is performed under the following parameters (except for test number 1):

All materials tested were produced to 70 grams per square meters

Fractional efficiency performed with particles sizes of; 0.3, 0.5, 5 and 10 micron.

Test velocity of 60 FPM

Voltage measurements performed with Chapman Corporation Voltmeter

Test 1 is a comparison of blends of polypropylene and modacrylic fibers with and without CCA's to determine the effects of the CCA's on efficiencies.

Formula A was standard 50/50 mixture of polypropylene and modacrylic with 5 percent fumed silica extruded as a CCA into the polypropylene fiber. Fibers of 3 and 2.5 denier were carded together to produce a 300 gram per square meter sample. The material was tribo-electrically charged on a sample card generating approximately 1,100 volts and after 30 days the charge state of 900 volts was measured. Both positive and negative charges were maintained.

Formula B consisted of fibers identical to the media of Formula A except that the polypropylene fibers in Formula B were undoped. Testing was performed on a TSI 8130 at 95 LPM.

Efficiency Percentages charged media Doped and Charged Media Undoped at 0.1 micron

|  | Formula A Doped | Formula B Undoped |
| --- | --- | --- |
| Penetration | .0375 | .10 |
| Efficiency | 99.9625% | 99.90% |

Test 1 shows that the use of charge control agent can help with the performance of an electrostatic filter material by increasing the penetration.

Tests 2 through 7 below use the same Formula A media, which allows one to compare this media to many others, and allows the others to be compared to one another.

Test 2 is a comparison of fiber blends containing polypropylene and acrylic fibers, where the fibers of Formula A are without CCA's and the fibers of Formula B contain CCA's.

Formula A included 25% PP round fibers 2.8 Dtex; 25% PP round fibers 2.5 Dtex; 25% acrylic wet spun kidney bean shaped fibers 2.2 Dtex; and 25% acrylic dry spun dog bone shaped fibers 3.3 Dtex.

Formula AB included 25% PP round fibers 2.8 Dtex; 25% PP round fibers 2.5 Dtex; 25% acrylic wet spun kidney bean shaped fibers 2.2 Dtex with 2% organic wax applied when crimping fibers; and 25% acrylic dry spun dog bone shaped fibers 3.3 Dtex.

| Particle Size (micron) | Efficiency of Formula A (%) | Efficiency of Formula AB (%) |
| --- | --- | --- |
| .3 | 48.78 | 61.98 |
| .5 | 62.88 | 73.68 |
| 5 | 84.38 | 89.24 |
| 10 | 99.12 | 99.64 |

The material was tribo-electrically charged to approximately 1,400 volts. After 120 days the charge was measured to be a positive 1,245 to negative −1,120 volts. Both negative and positive charges were throughout the material. With charge control agent selection, positive efficiencies were achieved demonstrating the improved effect by charging the fibers. Considerable improvements to efficiency are seen between 0.3 micron and 10 micron. Test 2 shows that wet spun kidney bean shaped fibers with 2% organic wax outperform the wet spun kidney bean shape fibers without CCAs.

Test 3 is like Test 2, but where the CCA's were on the polypropylene fibers rather than the acrylic fibers.

Formula A included 25% PP round fibers 2.8 Dtex; 25% PP round fibers 2.5 Dtex; 25% acrylic wet spun kidney bean shaped fibers 2.2 Dtex; and 25% acrylic dry spun dog bone shaped fibers 3.3 Dtex.

Formula AC included 25% PP round fibers 2.8 Dtex with 2% non-organic wax; 25% PP round fibers 2.5 Dtex; 25% acrylic wet spun kidney bean shaped fibers 2.2 Dtex; and 25% acrylic dry spun dog bone shaped fibers 3.3 Dtex.

| Particle Size (micron) | Efficiency of Formula A (%) | Efficiency of Formula AC (%) |
| --- | --- | --- |
| .3 | 46.23 | 62.38 |
| .5 | 61.14 | 74.52 |
| 5 | 81.69 | 90.72 |
| 10 | 99.06 | 99.73 |

The material was tribo-electrically charged to approximately 1,500 volts. After 120 days the charge was measured at a positive 1,080 to negative−1,385 volts. Both negative and positive charges were throughout the material. With charge control agent selection, positive efficiencies were achieved demonstrating the improved effect by charging of the fibers. Considerable improvement to efficiency is seen between 0.3 and 10 microns. Test 3 shows that adding the CCA's to the round PP fiber media results in better performance than when applying CCA's to the acrylic fibers.

Test 4 is like Test 2, but where the CCA's are applied to dog bone shaped fibers rather than kidney bean shaped fibers in Test 2.

Formula A included 25% PP round fibers 2.8 Dtex; 25% PP round fibers 2.5 Dtex; 25% acrylic wet spun kidney bean shaped fibers 2.2 Dtex; and 25% acrylic dry spun dog bone shaped fibers 3.3 Dtex.

Formula AD included 25% PP round fibers 2.8 Dtex; 25% PP round fibers 2.5 Dtex; 25% acrylic wet spun dog-bone shaped fibers 3.3 Dtex with 2% organic wax applied when crimping fibers; and 25% acrylic dry spun dog bone shaped fibers 3.3 Dtex.

| Particle Size (micron) | Efficiency of Formula A (%) | Efficiency of Formula AD (%) |
| --- | --- | --- |
| .3 | 46.23 | 62.38 |
| .5 | 61.14 | 76.52 |
| 5 | 81.69 | 90.67 |
| 10 | 99.06 | 99.9 |

The fibers were formed with the wax added to the outside of the fiber during the crimping process. The material was tribo-electrically charged to approximately 1,700 volts. After 30 days the charge was measured at positive 1,200 to negative −1,645 volts. Both negative and positive charges were throughout the material. With charge control agent plus fiber shape selection, positive efficiencies were achieved demonstrating the improved effect by charging and shape of the fiber. Considerable improvement to efficiency is seen between 0.3 and 10 microns. Test 4 shows that wet spun dog bone shaped fiber media performs better than wet spun kidney bean shaped fiber media with the organic wax on the outside of both fibers. This test also shows that when CCA's are added and the shape of the fiber is chosen carefully, performance is affected more than when only the shape of the fibers is chosen.

Test 5 compares the effect of using shaped polypropylene fibers to using round polypropylene fibers when both are in a blend with shaped acrylic fibers.

Formula A included 25% PP round fibers 2.8 Dtex; 25% PP round fibers 2.5 Dtex; 25% acrylic wet spun kidney bean shaped fibers 2.2 Dtex; and 25% acrylic dry spun dog bone shaped fibers 3.3 Dtex.

Formula AE included 25% PP dog bone shaped fibers 2.8 Dtex with 2% non-organic; 25% PP round fibers 2.5 Dtex; 25% acrylic wet spun kidney bean shaped fibers 2.2 Dtex; and 25% acrylic dry spun dog bone shape 3.3 Dtex.

| Particle Size (micron) | Efficiency of Formula A (%) | Efficiency of Formula AE (%) |
| --- | --- | --- |
| .3 | 46.16 | 47.16 |
| .5 | 62.63 | 78.31 |
| 5 | 83.21 | 93.14 |
| 10 | 99.07 | 99.9 |

The standard PP fibers were extruded with 2% PVDF added. The material was tribo-electrically charged to approximately 1,800 volts. After 30 days the charge was measured at a positive 1,400 to negative−1,700 volts. Both negative and positive charges were throughout the material.

With 2% charge control agent plus selected fiber cross-sectional shape, positive efficiencies were achieved, thereby demonstrating the improved effect by charging and by selecting the shape of the fiber. Considerable improvement in efficiency is seen between 0.3 and 10 microns.

With a charge control agent plus strategically selected fiber shape, positive efficiencies were achieved, thereby demonstrating the improved effect by charging and shape of the fiber. Considerable improvement to efficiency is seen between 0.3 and 10 microns. Test 5 shows that 2.8 Dtex PP dog-bone fiber media performs better than 2.8 Dtex round fiber when both have non-organic wax added to the fiber.

Test 6 compares the effect of CCA's on blends when shaped acrylic fibers are combined with round PP fibers and the CCA's are applied to the PP fibers.

Formula A was 25% PP round fibers 2.8 Dtex; 25% PP round fibers 2.5 Dtex; 25% acrylic wet spun kidney bean shape fibers 2.2 Dtex; and 25% acrylic dry spun dog bone shape 3.3 Dtex.

Formula AF was 25% PP round fibers 2.8 Dtex with 2% PVDF; 25% PP round fibers 2.5 Dtex; 25% acrylic wet spun kidney bean shaped fibers 2.2 Dtex; and 25% acrylic dry spun dog bone shaped fibers 3.3 Dtex.

| Particle Size (micron) | Efficiency of Formula A (%) | Efficiency of Formula AF (%) |
| --- | --- | --- |
| .3 | 40.21 | 72.89 |
| .5 | 59.47 | 81.72 |
| 5 | 78.28 | 96.41 |
| 10 | 98.71 | 99.9 |

The material was tribo-electrically charged to approximately 1,800 volts. After 30 days the charge was measured at a positive 1,300 to negative−1,680 volts. Both negative and positive charges were throughout the material.

With charge control agent selection, positive efficiencies were achieved, thereby demonstrating the improved effect of charging the fibers. Considerable improvement in efficiency is seen between 0.3 and 10 microns. Test 6 shows that 2.8 Dtex PP round fibers with 2% PVDF perform better than 2.8 Dtex round fiber without PVDF. This test also shows that PVDF performs better than wax-type CCA's when comparing Test 6 results with Tests 2, 3, 4 and 5.

Test 7 measures the effect of adding CCA's to shaped PP fibers in a blend of round and shaped PP fibers with shaped acrylic fibers, as compared to round PP fibers with shaped acrylic fibers and no CCA's.

Formula A included 25% PP round fibers 2.8 Dtex; 25% PP round fibers 2.5 Dtex; 25% acrylic wet spun kidney bean shaped fibers 2.2 Dtex; and 25% acrylic dry spun dog bone shaped fibers 3.3 Dtex.

Formula AG included 25% PP dog bone shaped fibers 2.8 Dtex with 2% PVDF; 25% PP round fibers 2.5 Dtex; 25% acrylic wet spun kidney bean shaped fibers 2.2 Dtex; and 25% acrylic dry spun dog bone shaped fibers 3.3 Dtex.

| Particle Size (micron) | Efficiency of Formula A (%) | Efficiency of Formula AG (%) |
| --- | --- | --- |
| .3 | 42.41 | 73.71 |
| .5 | 60.81 | 83.32 |
| 5 | 79.91 | 97.48 |
| 10 | 99.06 | 99.9 |

The fibers were spun with the wax added to the outside of the fiber during the crimping process. The material was tribo-electrically charged to approximately 1,900 volts. After 30 days the charge was measured at a positive 1,365 to negative −1,720 volts, with both negative and positive charges throughout the material.

With charge control agent plus fiber shape selection, positive efficiencies were achieved, thereby demonstrating the improved effect by charging and shape of the fiber. Considerable improvement to efficiency is seen between 0.3 and 10 microns.

Test 7 shows that 2.8 PP dog bone shaped fiber media with 2% PVDF performs better than 2.8 PP round fibers without PVDF and better than Test 6 in which only round PP fibers with PVDF were used. This test also shows that dog bone shaped fiber media with the CCA PVDF performs better than standard round fibers with or without PVDF.

Test 8 compares fiber blends with a small amount of round PP fibers with CCA's added combined with a larger amount of shaped PP fibers and shaped acrylic fibers to an identical blend without CCA's.

Formula B included 10% PP round fibers 1.4-1.7 Dtex; 40% PP round fibers 2.5 Dtex; 25% acrylic wet spun kidney bean shaped fibers 2.2 Dtex; and 25% acrylic dry spun dog bone shaped fibers 3.3 Dtex.

Formula BA included 10% PP round fibers 1.4-1.7 Dtex with 2% PVDF; 40% PP round fibers 2.5 Dtex; 25% acrylic wet spun kidney bean shaped fibers 2.2 Dtex; and 25% acrylic dry spun dog bone shaped fibers 3.3 Dtex.

| Particle Size (micron) | Efficiency of Formula B (%) | Efficiency of Formula BA (%) |
| --- | --- | --- |
| .3 | 48.82 | 81.38 |
| .5 | 66.29 | 91.68 |
| 5 | 82.18 | 98.16 |
| 10 | 98.91 | 99.9 |

The material was tribo-electrically charged to approximately 2,000 volts. After 30 days the charge was measured at a positive 1,395 to negative −1,770 volts, with both negative and positive charges throughout the material.

With charge control agent plus fiber shape and size selection, positive efficiencies were achieved, thereby demonstrating the improved effect by charging, shape and size of the fiber. Considerable improvement to efficiency is seen between 0.3 and 10 microns.

Test 8 shows that round micro denier fibers with PVDF perform better than small fibers without PVDF. A small amount of micro fibers help the performance. This test shows that micro fibers help performance without CCA's and micro fibers with PVDF perform even better.

Test 9 compared the effect of adding CCA's to a small fraction of shaped PP fibers in a blend of mostly round PP fibers and shaped acrylic fibers to an identical blend that had no CCA's, only round PP fibers and shaped acrylic fibers.

Formula B included 10% PP round fibers 1.4-1.7 Dtex; 40% PP round fibers 2.5 Dtex; 25% acrylic wet spun kidney bean shaped fibers 2.2 Dtex; and 25% acrylic dry spun dog bone shaped fibers 3.3 Dtex.

Formula BB included 10% PP dog bone shaped fibers 1.4-1.7 Dtex with 2% PVDF; 40% PP round fibers 2.5 Dtex; 25% acrylic wet spun kidney bean shaped fibers 2.2 Dtex; and 25% acrylic dry spun dog bone shaped fibers 3.3 Dtex.

| Particle Size (micron) | Efficiency of Formula B (%) | Efficiency of Formula BB (%) |
| --- | --- | --- |
| .3 | 49.92 | 83.38 |
| .5 | 68.38 | 93.72 |
| 5 | 84.24 | 98.82 |
| 10 | 99.10 | 99.9 |

The material was tribo-electrically charged to approximately 2,400 volts. After 30 days the charge was measured at a positive 1,475 to negative −1,811 volts, with both negative and positive charges throughout the material.

With charge control agent plus fiber shape and size selection, positive efficiencies were achieved demonstrating the improved effect by charging, shape and size of the fiber. Considerable improvement to efficiency is seen between 0.3 and 10 microns.

Test 9 shows that adding PP dog bone shaped small denier fibers with PVDF to media causes the media to perform better than micro fibers without PVDF. Additionally, a small amount of dog-bone shaped micro fibers helps the performance more than round micro fibers.

Test 10 tests whether a CCA on a small amount of shaped PP fibers blended with round PP fibers and shaped acrylic fibers improves performance over a similar blend without CCA's and only round PP fibers.

Formula C included 5% PP round fibers 1.4-1.7 Dtex; 45% PP round fibers 2.5 Dtex; 45% acrylic wet spun kidney bean shaped fibers 2.2 Dtex; and 5% acrylic dry spun dog bone shaped fibers 1.4-1.7 Dtex.

Formula CA included 5% PP dog-bone shaped fibers 1.4-1.7 Dtex with 2% PVDF; 45% PP round fibers 2.5 Dtex; 45% acrylic wet spun kidney bean shaped fibers 2.2 Dtex; and 5% acrylic dry spun dog bone shaped fibers 1.4-1.7 Dtex.

| Particle Size (micron) | Efficiency of Formula C (%) | Efficiency of Formula CA (%) |
| --- | --- | --- |
| .3 | 54.61 | 84.62 |
| .5 | 69.19 | 94.81 |

| Particle Size (micron) | Efficiency of Formula C (%) | Efficiency of Formula CA (%) |
| --- | --- | --- |
| 5 | 84.46 | 98.87 |
| 10 | 99.12 | 99.9 |

The material was tribo-electrically charged to approximately 2,800 volts. After 30 days the charge was measured at a positive 1,695 to negative −2,160 volts with both negative and positive charge throughout the material.

With charge control agent plus fiber shape and size selection, positive efficiencies were achieved, thereby demonstrating the improved effect by charging, shape and size of the fiber. Considerable improvement to efficiency is seen between 0.3 and 10 microns.

Test 10 shows that using both dry spun dog bone shaped fibers and PP dog bone shaped micro fibers show filter performance, and when PVDF is added to the dog-bone shaped PP fibers it show another significant performance improvement.

Test 11 compares the effect when a blend of shaped and round PP fibers with shaped acrylic fibers have CCA's added to the shaped PP fibers and the shaped acrylic fibers as compared to a blend of round PP fibers and shaped acrylic fibers, neither of which have CCA's added.

Formula D included 5% PP round fibers 1.4-1.7 Dtex; 45% PP round fibers 2.5 Dtex; 45% acrylic wet spun kidney bean shaped fibers 2.2 Dtex; and 5% acrylic dry spun dog bone shaped fibers 1.4-1.7 Dtex.

Formula DA (one of the preferred blends) included 22.5% PP dog bone shaped fibers 2.8 Dtex with 2% PVDF; 22.5% PP round fibers 2.8 Dtex with 2% non-organic wax; 5% PP dog bone shaped fibers 1.4-1.7 Dtex; 5% acrylic dry spun dog bone shaped fibers 1.4-1.7 Dtex; 22.5% acrylic wet spun dog bone shaped fibers 3.3 Dtex with 2% organic wax; and 22.5% acrylic dry spun dog bone shaped fibers 3.3 Dtex with 3-dimensional crimped fibers.

| Particle Size (micron) | Efficiency of Formula D (%) | Efficiency of Formula DA (%) |
| --- | --- | --- |
| .3 | 54.61 | 87.83 |
| .5 | 69.19 | 95.66 |
| 5 | 84.46 | 98.92 |
| 10 | 99.12 | 99.93 |

The material was tribo-electrically charged to approximately 2,600 volts. After 30 days the charge was measured at a positive 1,575 to negative −1,825 volts with both negative and positive charges throughout the material.

With charge control agent plus fiber shape and size selection, positive efficiencies were achieved, thereby demonstrating the improved effect by charging, shape and size the fiber. Considerable improvement to efficiency is seen between 0.3 and 10 microns.

Test 11 includes a preferred blend and shows combining the best of the prior 10 tests and having PP dog-bone shaped fibers with a CCA, with some PP 2.5 standard round fibers plus dry-spun acrylic dog bone shaped fibers with the wet spun dog bone shaped fibers with a CCA on the outside of the fiber plus 5% each of the dog-bone shaped PP fibers and acrylic of micro fibers on the PP with a CCA added to results in the best performing filtration media contemplated by the invention.

From the testing provided above, it is clear that the combination of shapes and the use of charge control agents make a superior electrostatic performing filtration media and demonstrates the invention is novel.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A method of making a non-woven electret gas filter media, the method comprising:
   (a) dry spinning a plurality of acrylic fibers;
   (b) three dimensionally crimping the fibers; and
   (c) forming a non-woven electret gas filter media from the fibers.

2. The method in accordance with claim 1, further comprising the step of blending at least some polypropylene fibers with the acrylic fibers.

3. The method in accordance with claim 1, further comprising the step of blending at least some dog bone shaped polypropylene fibers with the acrylic fibers.

4. A method of making a non-woven electret gas filter media, the method comprising:
   (a) dry spinning a plurality of acrylic fibers;
   (b) three dimensionally crimping the dry spun acrylic fibers;
   (c) wet spinning a plurality of acrylic fibers; and
   (d) forming a non-woven electret gas filter media from a combination of the three dimensionally crimped dry spun acrylic fibers and the wet spun acrylic fibers.

5. The method in accordance with claim 4, further comprising the step of blending at least some polypropylene fibers with the acrylic fibers.

6. The method in accordance with claim 4, further comprising the step of blending at least some dog bone shaped polypropylene fibers with the acrylic fibers.

* * * * *